US006096415A

United States Patent [19]

Liebler et al.

[11] Patent Number: 6,096,415

[45] Date of Patent: Aug. 1, 2000

[54] RECORDING MATERIAL FOR ELECTROSTATIC OR ELECTROGRAPHIC RECORDINGS

[75] Inventors: Ralf Liebler, Kreuzau; Walter von Wirth, Dueren; Richard Lack, Bergheim; Frank Frings, Nideggen, all of Germany

[73] Assignee: Sihl GmbH, Dueren, Germany

[21] Appl. No.: 08/879,783

[22] Filed: Jun. 20, 1997

[30] Foreign Application Priority Data

Jun. 25, 1996 [DE] Germany .......................... 196 25 304

[51] Int. Cl.[7] ........................................ B32B 3/26

[52] U.S. Cl. .................. 428/315.5; 428/480; 428/474.4; 428/500

[58] Field of Search ................................ 428/315.5, 480, 428/474.4, 500

[56] References Cited

U.S. PATENT DOCUMENTS

| | | | |
|---|---|---|---|
| 4,024,311 | 5/1977 | MacDonald et al. | 428/342 |
| 4,026,703 | 5/1977 | Hayashi et al. | 96/1.5 |
| 4,105,449 | 8/1978 | Tanei et al. | 96/1.8 |
| 4,795,676 | 1/1989 | Maekawa et al. | 428/328 |
| 4,976,138 | 12/1990 | Benninghoff et al. | 73/73 |
| 5,424,155 | 6/1995 | Nakayama et al. | 430/49 |
| 5,672,392 | 9/1997 | De Clercq et al. | 427/391 |

FOREIGN PATENT DOCUMENTS 195 32 303 3/1997 Germany .

OTHER PUBLICATIONS

Derwent Abstract 97–180675/17 for DE 195 32 303, Mar. 1997.

*Patent Abst. of Japan,* vol. 94, No. 107, Aug. 1994 (JP 6–230586A, Aug. 19, 1994).

*Primary Examiner*—Mark Chapman
*Attorney, Agent, or Firm*—Keil & Weinkauf

[57] ABSTRACT

Electrostatic or electrographic recording material comprising a microporous synthetic thermoplastic polymer as a sheet-like base material, having a content of at least 20 wt %, based on the total weight of the base material, of finely dispersed inorganic fillers and comprising an electrically conductive layer arranged on at least one surface of said base material, and a dielectric recording layer disposed on the electrically conductive layer.

7 Claims, No Drawings

RECORDING MATERIAL FOR ELECTROSTATIC OR ELECTROGRAPHIC RECORDINGS

The invention relates to a multilayer recording material for electrostatic or electrographic recordings.

PRIOR ART

Such recording materials are known in principle. They often comprise a polymer base layer having suitable dimensional stability, which has an electrically conductive layer on at least one surface and further has a dielectric recording layer disposed on the electrically conductive layer.

However, conventional recording materials of this type do not, when colored areas are produced, meet the necessary requirements in terms of image quality, adhesion of the pigment material or the toner on the recording layer to allow solid-colour recordings to be produced in art quality.

SUMMARY OF THE INVENTION

The object of the present invention is to improve the known recording materials.

This object is achieved by a multilayer electrostatic or electrographic recording material comprising a polymer base material and an electrically conductive layer disposed on at least one surface of the base material, and a dielectric recording layer disposed on the electrically conductive layer, wherein, the polymer base material is a microporous synthetic thermoplastic polymer having a content of at least 20 wt %, based on the total weight of base material, of finely dispersed inorganic fillers.

DETAILED DESCRIPTION OF THE INVENTION

The sheet-like base material to be used preferably comprises a percentage of filler of at least 40 wt %, based on the total weight of the support material. The percentage of filler can be up to 90 wt %, but is preferably in the range of 30–80 wt %.

Suitable as finely dispersed inorganic fillers are calcium carbonate, kaolin, aluminum oxide, aluminum hydroxide, barium sulfate, precipitated synthetic silica or fumed silica or mixtures thereof.

Prior to being incorporated into the polymer material the filler may have an average particle size of from 0.01 to 40 $\mu$m, preferably of from 0.1 to 25 $\mu$m, particularly preferably of from 0.1 to 3 $\mu$m.

The filler may also be present in the form of aggregated primary particles or agglomerates thereof, although these may undergo size reduction when being introduced into the polymer material. In the polymer matrix the filler is therefore often present in a more finely dispersed form than prior to its introduction.

The thermoplastic polymer for the base material may comprise polyolefins, in particular polypropylene or polyethylene, polyester, polystyrene, polyamide or poly (vinyl chloride).

Especially preferred are linear polyolefins having a very high molecular weight, for example essentially linear polyethylene or isotactic polypropylene, the molecular weight being very high in each case. The molecular weight can be determined via the intrinsic viscosity in accordance with ASTM D 4020-81. In the case of the polyolefins the viscosity should be from 18 to 40 dl/g.

The high percentage of filler in the polymer matrix means that the base material overall is microporous. The volume fraction of the interconnected pores is more than 50 vol %, preferably more than 80 vol %, and may attain up to 95 vol %. This can be achieved by the material, having been drawn into a film after the fillers have been incorporated into softened polymer, is additionally extracted with solvents which will not dissolve the polymer or cause it to swell, to extract processing aids such as plasticisers.

The base material has a microporous structure in which the filler is embedded in a matrix of synthetic polymers. This structure produces a water absorption capacity, determined by means of the Cobb value in accordance with ISO 535–1976(E) with a measuring time of 12 seconds, of from 30 $g/m^2$ to 120 $g/m^2$, preferably at least 50 $g/m^2$.

Advantages also attach to biaxial stretching and optionally thermal after-treatment of the highly filled polymer film prior to the application of the electrically conductive layer onto at least one of the surfaces of the microporous base material.

The microporous structure and the good water absorption capacity of the base material cause the electrically conductive polymers, which are applied from an aqueous medium to form the electrically conductive layer, to penetrate deeply into the base material and not only to reduce the surface resistivity of the base material provided with the electrically conductive layer to values of from $1\times10^5$ to $1\times10^{13}$, preferably from $1\times10^6$ to $1\times10^9$ ohms per square at 20° C. and 50% relative humidity, but also reduce the volume resistance of the coated base material. Prior to the application of the electrically conductive polymer onto the microporous base material the electrical volume resistance is 1.5×10 ohms×cm. After the application of the electrically conductive polymers the electrical volume resistance is $6\times10^6$ ohms×cm to $10\times10^9$ ohms×cm.

Electrically conductive polymers suitable for coating and impregnating the porous base material include sulfonated polystyrenes, copolymers of dimethylammonium chloride and diacetone acrylamide, poly(dimethyldialkylammonium), quaternary cellulose acetates, quaternary acrylic resins, poly(vinyl butyral) derivatives, copolymers of dimethyldiallylammonium chloride and N-methylacrylamide, and other polymers known to form electrically conductive layers.

The electrically conductive polymer or polymer mixture is applied onto and into the microporous base material in an amount of from 0.5 to 5 $g/m^2$, preferably from 1 to 3 $g/m^2$, to ensure that the electrical surface and volume conductivity of the base material is adequate for dielectric recording materials.

The electrical conductivity of the base material after application of the polymers is humidity-independent over a wide range of from 10% relative ambient humidity to 85% relative ambient humidity.

Present on the electrically conductive layer is a dielectric recording layer having a surface resistivity of from $0.3\times10^6$ to $3\times10^9$ ohms/square, so that applied static electric charge persists for a sufficiently long time in the form of a latent image to allow conventional toner material to be deposited on the recording layer to generate an image.

Suitable for forming the dielectric layer are, in particular, film-forming polymers which also serve as binders for fillers and/or pigments and which confer upon the layer an electrical volume resistance of $10^{12}$ ohms×cm or more.

The layer may have a thickness of from 2 to 10 $\mu$m, the coating weight may be 1–5 $g/m^2$.

Examples of suitable polymers are polystyrene, polycarbonates, polyolefins (which may or may not be halogenated) such as polyethylene, polypropylene, polybutylene, (meth)acrylic resins, poly(vinyl butyral), polyester resins, polyvinyl resins, cellulose acetates, epoxy resins. Mixtures of compatible polymers can also be used.

Examples of pigments/fillers present in the dielectric layer are finely dispersed fumed silica, calcium carbonate, aluminum silicate and/or finely dispersed organic pigments.

The percentage of pigments may be from 4 wt % to 55 wt %, based on the total weight of the dielectric layer.

The coating composition may further contain conventional aids such as dispersants, wetting agents, anti-foaming agents, UV stabilizers, if the dielectric behavior of the layer formed after drying of the aqueous coating composition applied is not impaired thereby.

The invention will now be explained in more detail with reference to the following examples.

EXAMPLE 1

The microporous polymer base material used is a commercially available microporous filled film on a polyolefin basis (polyethylene basis, manufacturer PPG IND. INC., Pittsburgh, Pa.).

To form the electrically conductive layer, an aqueous composition comprising 40 parts by weight of methanol, 47 parts by weight of water and 13 parts by weight of a water-soluble polycationic polymer (EMISTAD 6300H from Sanjo Chemical Industries) is employed.

After drying the coated/impregnated microporous base material contains 1.2 g/m$^2$ of conductive polymer. The electrical surface resistivity at 50% relative humidity and 20° C. is $1\times10^7$ ohms/square on one side and $1.5\times10^7$ ohms/square on the opposite surface. The electrical volume resistance is $3.5\times10^6$ ohms×cm and $4\times10^6$ ohms×cm, respectively.

To form the dielectric recording layer, the following coating composition is employed:

| | |
|---|---|
| Toluene | 71.3 parts by weight |
| Isopropanol | 11.5 parts by weight |
| Poly (vinyl butyral) (B 76, Monsanto Chemical Co.) (Molecular weight 34,000–38,000) | 8.6 parts by weight |
| Natural calcium carbonate (Calcilit 4, Grace) | 7.6 parts by weight |
| Amorphous silicon dioxide (Syloid Al 1, Grace) | 0.5 parts by weight |
| Synthetic amorphous silica (OK 412, Degussa) | 0.5 parts by weight |

A dielectric layer having an areal density of 2 g/m$^2$ is formed.

The specific electrical surface resistivity of the dielectric layer is $1\times10^8$ ohms/m$^2$, the electrical volume conductivity of the recording material is $5\times10^7$ ohms×cm.

EXAMPLE 2

The microporous polymer base material used is a commercially available filled film on a polyolefin basis (polyethylene basis, manufacturer PPG IND. INC.).

To form the electrically conductive layer, the microporous base material is coated with the following composition:

| | |
|---|---|
| Methanol | 20 parts by weight |
| Water | 67 parts by weight |
| Quaternary polymeric compound (Makrovil ECR 69L, Indulor GmbH) | 9 parts by weight |
| Poly (vinyl alcohol) (Mowiol 4/88, Hoechst) | 4 parts by weight |

After drying, the microporous base material contains about 2.5 g/m$^2$ of the solids of the coating composition.

The electrical surface resistivity at 50% RH and 20° C. is $1.5\times10^7$ ohms/square on one side and $3\times10^7$ ohms/square on the opposite side. The electrical volume resistance is $7\times10^6$ ohms×cm.

To form the dielectric recording layer a coating composition is used which comprises:

| | |
|---|---|
| Toluene | 68 parts by weight |
| Isopropanol | 16 parts by weight |
| Poly (vinyl butyral) (Butvar B-76, from Monsanto Chemical Co.) | 9 parts by weight |
| Natural calcium carbonate | 6 parts by weight |
| Amorphous silicon dioxide | 0.5 parts by weight |
| Synthetic amorphous silica | 0.5 parts by weight |

The coating weight of the dielectric layer is 2 g/m$^2$ of the dry constituents of the coating composition.

The specific electrical surface resistivity of the dielectric recording layer is $1\times10^8$ ohms/square. The electrical volume conductivity is $3\times10^7$ ohms×cm.

EXAMPLE 3

Use is made of the microporous base material coated with an electrically conductive polymer according to Example 1.

To form the dielectric layer, a coating composition is applied which comprises:

| | |
|---|---|
| Toluene | 74 parts by weight |
| Isopropanol | 14 parts by weight |
| Poly (vinyl butyral) (Butvar B-76, from Monsanto Chemical Co.) | 7.0 parts by weight |
| Calcium carbonate (Calcilit 4) | 4.4 parts by weight |
| Amorphous silicon dioxide (Syloid Al 1, Grace) | 0.2 parts by weight |
| Synthetic amorphous silica (OK 412, Degussa) | 0.4 parts by weight |

The dielectric layer is applied in an amount of 2 g/m$^2$ of the dry constituents of the coating composition. The dielectric recording layer has an electrical surface resistivity of $3\times10^7$ ohms/square and an electrical volume resistance of $2.5\times10^7$ ohms×cm at 50% RH and 20° C.

EXAMPLE 4

For this example use is made of the microporous base material, made electrically conductive, of Example 2.

To form the dielectric recording layer a coating composition is used which comprises:

| | |
|---|---|
| Toluene | 25 parts by weight |
| Acetone | 56 parts by weight |
| Amorphous sodium/aluminum silicate (P 820, Degussa) | 3 parts by weight |
| Poly (vinyl acetate)/crotonic acid copolymer (Mowilit CT 5 from Hoechst) | 16 parts by weight |

The coating weight of the dielectric layer is 4 g/$m^2$.

The dielectric recording layer has a specific surface resistivity of $1.5\times10^7$ ohms/square on the one side and $3\times10^7$ ohms/square on the opposite side.

EXAMPLE 5

A microporous base material according to Example 2 is coated, to form the electrically conductive layer, with a composition comprising:

| | |
|---|---|
| Isopropanol | 1.0 part by weight |
| Water | 90 parts by weight |
| Poly (vinyl alcohol) | 9.0 parts by weight |

After drying the microporous base material contains 2 g/$m^2$ of the dry constituents of the coating composition.

The electrical surface resistivity at 50% RH and 20° C. is $3\times10^9$ ohms/square, and the electrical volume resistance is $2\times10^7$ ohms/cm.

The dielectric layer is formed, with an areal density of 5 g/$m^2$, from the following composition:

| | |
|---|---|
| Toluene | 54.5 parts by weight |
| Vinyl copolymer (Synocryl 877 S from Cray Valley Prod.) | 28.3 parts by weight |
| Amorphous silica coated with fluoride (Silcron G 300 from Langer & Co. GmbH) | 0.85 parts by weight |
| Amorphous silicon dioxide (Syloid Al 1, Grace) | 0.85 parts by weight |
| Calcium carbonate (Calcidor 5, Omya) | 17.5 parts by weight |

The electrical surface resistivity of the recording layer is $7\times10^{11}$ ohms/square, and the electrical volume resistance is $1\times10^{10}$ ohms/cm.

EXAMPLE 6

A microporous base material according to Example 2 was equipped with an electrically conductive layer by a composition being applied which comprised:

| | |
|---|---|
| Methanol | 62 parts by weight |
| Glycol | 7 parts by weight |
| Water soluble polycationic polymer (Chemistat 6300 H Sanjo Chemical Industries) | 31 parts by weight |

After drying, the microporous base material contains 1.5 g/$m^2$ of the dry constituents of the coating composition.

The electrical surface resistivity is $2.5\times10^6$ ohms/square on one side and $3.5\times10^6$ ohms/$m^2$ on the opposite side. The electrical volume resistance is $3\times10^6$ ohms×cm, each measured at 50% RH and 20° C.

The dielectric recording layer is formed from a coating composition comprising:

| | |
|---|---|
| Toluene | 62 parts by weight |
| Vinyl copolymer (Synocryl 877 S from Cray Valley Prod.) | 37 parts by weight |
| Synthetic amorphous silica (OK 412, Degussa) | 0.5 parts by weight |
| Synthetic amorphous silica (FK 320, Degussa) | 0.5 parts by weight |

The dielectric layer has an areal density of 6 g/$m^2$ and an electrical surface resistivity of $2.5\times10^7$ ohms/square at 50% RH and 20° C. The electrical volume resistance of the recording material is $1.5\times10^7$ ohms×cm.

EXAMPLE 7

This example makes use of the microporous base material, equipped with an electrically conductive layer, of Example 1.

To form the dielectric layer, a coating composition is applied with an areal density of 6 g/$m^2$, comprising:

| | |
|---|---|
| Toluene | 60 parts by weight |
| Vinyl copolymer (Synocryl 877 S from Cray Valley Prod.) | 38 parts by weight |
| Synthetic amorphous silica (OK 412, Degussa) | 2 parts by weight |

The electrical surface resistivity of the dielectric recording layer is $6\times10^7$ ohms/square, and the recording material has an electrical volume resistance of $2\times10^7$ ohms×cm, each measured at 50% RH and 20° C.

EXAMPLE 8

Applied onto a microporous base material (filled polyolefin film), to form an electrically conductive layer, is a coating composition which comprises:

| | |
|---|---|
| Water | 70 parts by weight |
| Poly (vinyl alcohol) (4/98, Hoechst) | 3 parts by weight |
| Water soluble polycationic polymer (Chemistat 6300 H from Sanjo Chemical Industries) | 24 parts by weight |
| Synthetic amorphous silicic acid (OK 412, Degussa) | 3 parts by weight |

The amount applied, as dry matter, is 0.8 g/$m^2$.

The synthetic microporous base material rendered electrically conductive has an electrical surface resistivity of $3.5\times10^6$ ohms/square and an electrical volume resistance of $3\times10^6$ ohms×cm, each measured at 50% RH and 20° C.

Applied onto this base material, to form the dielectric recording layer, is a composition which comprises:

| | |
|---|---|
| Toluene | 63 parts by weight |
| Vinyl copolymer | 28 parts by weight |
| Synthetic amorphous silicic acid (OK 412, Degussa) | 0.8 parts by weight |
| Amorphous silicon dioxide (Syloid Al 1, Grace) | 0.8 parts by weight |
| Calcium stearate | 7.4 parts by weight |

The coating weight is 5 g/m$^2$.

The dielectric recording layer, at 50% RH and 20° C., has an electrical surface resistivity of $3\times10^7$ ohms/square and an electrical volume resistance of $6\times10^6$ ohms×cm

EXAMPLE 9

Preparation of a porous polymer substrate comprising polypropylene.

| | |
|---|---|
| Paraffin oil (Merck, Darmstadt, #10 06 71) | 3800 g |
| Silica (FK 310, Degussa) | 620 g |
| Stearic acid (Merck, Darmstadt, #10 06 71) | 12 g |
| Antioxidant (Irganox D215, Ciba-Geigy) | 15 g |
| Polypropylene powder (#18 239-7, Aldrich) | 470 g |

The paraffin oil is heated to about 105° C. and the silica, the stearic acid and the antioxidant are dispersed therein by 10 minutes' stirring. Then the polypropylene powder is incorporated by 10 minutes' stirring. The mixture is molded into a sheet through a slot die having a gap width of 200 $\mu$m. The sheet obtained is treated by means of a calender and in the process cooled to room temperature. The paraffin oil is then extracted with trichloroethylene. After drying the porous sheet has a water absorption capacity, according to Cobb, of 80 g/m$^2$.

To form the electronically conductive layer, the microporous base material is coated with the following composition:

| | |
|---|---|
| Methanol | 20 parts by weight |
| Water | 67 parts by weight |
| Quaternary polymeric compound (Makrovil ECR 69L, Indulor GmbH) | 9 parts by weight |
| Poly (vinyl alcohol) (Mowiol 4/88, Hoechst) | 4 parts by weight |

After drying, the microporous base material contains about 2.5 g/m$^2$ of the solids of the coating composition.

The electrical surface resistivity at 50% RH and 20° C. is $2.0\times10^7$ ohms/square on one side and $3.2\times10^7$ ohms/square on the opposite side. The electrical volume resistance is $7.2\times10^6$ ohms×cm.

To form the dielectric recording layer a composition is used, which comprises:

-continued

| | |
|---|---|
| Toluene | 68 parts by weight |
| Isopropanol | 16 parts by weight |
| Poly (vinyl butyral) (Butvar B-76, from Monsanto Chemical Co.) | 9 parts by weight |
| Natural calcium carbonate (Calcilit 4) | 6 parts by weight |
| Amorphous silicon dioxide (Syloid Al 4, Grace) | 0.5 parts by weight |
| Synthetic amorphous silicic acid (OK 412, Degussa) | 0.5 parts by weight |

The coating weight of the dielectric layer is 2 g/m$^2$ of the dry constituents of the coating composition.

The electrical surface resistivity of the dielectric recording layer is $1.5\times10^8$ ohms/square. The electrical volume resistance is $3\times10^7$ ohms×cm.

EXAMPLE 10

A porous polymer substrate is prepared as follows:

| | |
|---|---|
| Naphthalene (#106 200, Merck, Darmstadt) | 4,150 g |
| Silica (Syloid 244, Grace) | 700 g |
| Stearic acid (#10 0671, Merck, Darmstadt) | 15 g |
| Antioxidant (Irganox D215, Ciba Geigy) | 20 g |
| Polyethylene terephthalate, Merck-Index M, 7546 (#20 025-5, Aldrich) | 590 g |

The components 2 to 4 are incorporated into molten naphthalene, heated to about 145° C., and are dispersed by 10 minutes' stirring. Then the polyethylene terephthalate is introduced with stirring over a period of 10 min. The homogeneous mixture obtained is molded into a sheet by means of a slot die (gap width 200 $\mu$m).

The sheet is treated by means of a calender and in the process cooled to room temperature. The naphthalene is then extracted with toluene. The porous sheet obtained has a water absorption capacity, according to Cobb, of 70 g/m$^2$.

The electrically conductive layer is formed as described in Example 1.

To form the dielectric layer, a coating composition is applied which comprises:

| | |
|---|---|
| Toluene | 74 parts by weight |
| Isopropanol | 14 parts by weight |
| Poly (vinyl butyral) (Butvar B-76, Monsanto Chemical Co.) | 7.0 parts by weight |
| Calcium carbonate (Calcilit 4) | 4.4 parts by weight |
| Amorphous silicon dioxide (Syloid Al 1, Grace) | 0.2 parts by weight |
| Synthetic amorphous silica (OK 412, Degussa) | 0.4 parts by weight |

The dielectric layer is applied in an amount of 2 g/m$^2$ of the dry constituents of the coating composition. The dielectric recording layer has an electrical surface resistivity of $3.2\times10^7$ ohms/square and an electrical volume resistance of $2.8\times10^7$ ohms×cm at 50% RH and 20° C.

EXAMPLE 11

Preparation of a porous polymer substrate based on PVC:

| | |
|---|---|
| Cyclohexanone | 3,950 g |
| Silica (FK 310, Degussa) | 680 g |
| Stearic acid | 10 g |
| Antioxidant (Irganox D215, Ciba Geigy) | 12 g |
| High molecular weight poly (vinyl chloride) (#34, 676-4, Aldrich) | 610 g |

The ingredients 2 to 4 are introduced, with 10 minutes' stirring, into the cyclohexanone heated to about 95° C. and are dispersed. Then the PVC powder is incorporated by means of stirring. The mixture obtained is formed into a sheet by means of a slot die (gap width 200 μm). The sheet is calendered on a calender and cooled to room temperature. Cyclohexanone is extracted by means of acetone. After drying the porous sheet has a water absorption capacity, according to Cobb, of 85 $g/m^2$.

Then the electrically conductive composition is applied as described in Example 1.

The dielectric layer is formed by the following composition being applied in a weight of 4 $g/m^2$ (after drying):

| | |
|---|---|
| Toluene | 25 parts by weight |
| Acetone | 56 parts by weight |
| Amorphous sodium/aluminum silicate (P 820, Degussa) | 3 parts by weight |
| Poly (vinyl acetate)/crotonic acid copolymer (Mowilit CT 5 from Hoechst) | 16 parts by weight |

The dielectric recording layer has a surface resistivity of $2.0 \times 10^7$ ohms/square on the one side and $2.5 \times 10^7$ ohms/square on the opposite side.

The recording materials of Examples 1 to 11 were provided with recordings in an electrostatic printer CE 300 from Versatec. Areas colored black, cyan, magenta and yellow were formed. Mixed colors were produced by mixing of the abovementioned primary colors. The generated images had excellent brilliancy. The adhesion of the inks on the dielectric recording layer was good.

We claim:

1. An electrostatic or electrographic recording composition comprising a polymeric base material and an electrically conductive layer comprising an electrically conductive polymer;

said electrically conductive layer being disposed on at least one surface of the polymeric base material;

and a dielectric recording layer having a surface resistivity of from $0.3 \times 10^6$ to $3 \times 10^9$ ohms/square disposed on the electrically conductive layer;

said polymeric base material comprising a microporous synthetic thermoplastic polymer film having a volume fraction of interconnected pores of from >50 vol % to 95 vol %;

said polymeric base material comprising from 30–90 wt %, based on the total weight of the polymeric base material, of a finely dispersed organic filler which is embedded in the polymeric base material;

said polymeric base material having a water absorption capacity, determined by means of the Cobb value in accordance with ISO 535–1976(E) with a measuring time of 12 seconds, of from 30 $g/m^2$ to 120 $g/m^2$;

said polymeric base material having an electrical volume resistance after said electrically conductive layer is disposed thereon of from $6 \times 10^6$ ohms×cm to $10 \times 10^9$ ohms×cm; wherein disposition of the electrically conductive layer on the polymeric base material results in the polymeric base material becoming impregnated with the electrically conductive polymer of the electrically conductive layer.

2. The recording material of claim 1, wherein the base material contains from 30 wt % to 80 wt %, based on the total weight, of finely dispersed inorganic filler(s).

3. The recording material of claim 1, wherein the filler contained in the base material comprises calcium carbonate, kaolin, aluminum oxide, aluminum hydroxide, barium sulfate, precipitated silica or fumed silica or mixtures thereof.

4. The recording material of claim 1, wherein the synthetic polymer of the base material is selected from the group consisting of polyolefins, polyesters, polystyrene, polyamide or poly(vinyl chloride).

5. The recording material of claim 4, wherein the synthetic polymer of the base material is linear polyethylene or isotactic polypropylene.

6. The recording material of claim 1, wherein the electrically conductive layer comprises sulfonated polystyrenes, copolymers of dimethylammonium chloride and diacetoneacrylamide, poly(dimethyldialkylammonium chloride) quaternary cellulose acetates, quaternary acrylic resins, copolymers of dimethyldiallylammonium chloride and N-methyl-acrylamide, poly(vinyl butyral) derivatives or mixtures thereof.

7. The recording material of claim 1, wherein the dielectric recording layer comprises polystyrene, polycarbonate, polyolefins (which may or may not be halogenated), (meth)acrylic resins, poly(vinyl butyral), polyester resins, polyvinyl resins, cellulose acetate, epoxy resins or mixtures thereof.

* * * * *